Sept. 16, 1924.

V. J. ODHNER 1,508,752

MEANS FOR ATTACHING CRANKS TO CALCULATING MACHINES

Filed March 29, 1922  3 Sheets-Sheet 1

Inventor
V. J. Odhner,
By Marks&Clerk
Attys.

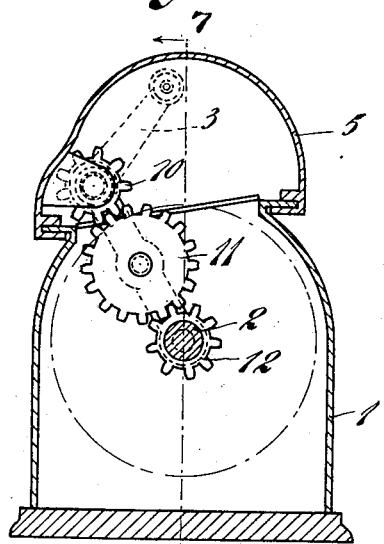
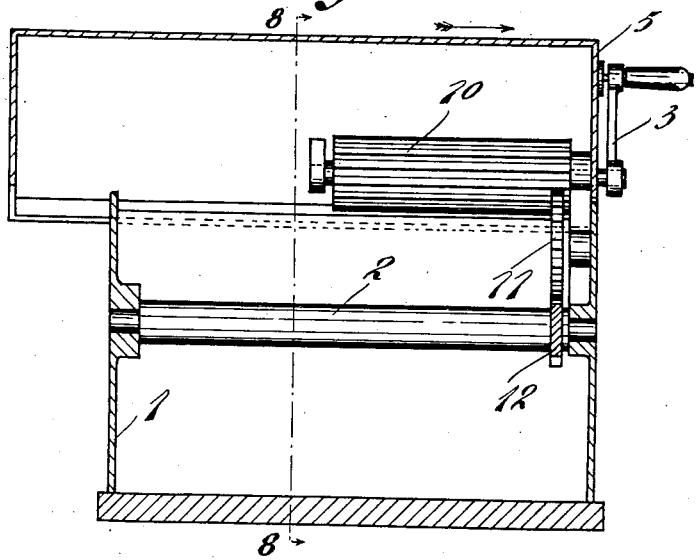

Inventor
V. J. Odhner,
By Marks & Clerk
Attys.

Patented Sept. 16, 1924.

1,508,752

UNITED STATES PATENT OFFICE.

VALENTIN JAKOB ODHNER, OF STOCKHOLM, SWEDEN.

MEANS FOR ATTACHING CRANKS TO CALCULATING MACHINES.

Application filed March 29, 1922. Serial No. 547,941.

*To all whom it may concern:*

Be it known that I, VALENTIN JAKOB ODHNER, a subject of the King of Sweden, and resident of Vikingagatan 30, Stockholm, in the Kingdom of Sweden, have invented certain new and useful Improvements in Means for Attaching Cranks to Calculating Machines, of which the following is a specification, reference being had therein to the accompanying drawings.

In ordinary calculating machines with calculating wheels the crank for turning the wheels is journalled in the framework of the machine. However this is not found convenient for several reasons, one of which is that the carriage which supports the indicating discs etc. and which is slidably mounted in the framework at the calculating operation is extended more or less, which makes it more difficult to turn the crank. It is true that said disadvantage can be partly overcome by mounting the crank at a distance from the framework, which is equal to or greater than the maximum extension of the carriage but the length of the machine is correspondingly increased.

The object of the present invention is to obviate said disadvantages. According to the present invention the crank for turning the calculating wheels is journalled in the carriage which is slidably mounted in the framework and is connected with the calculating wheels or the common shaft of the latter in such a way that the calculating wheels can be turned by means of the crank in any position of the carriage.

Figure 1:
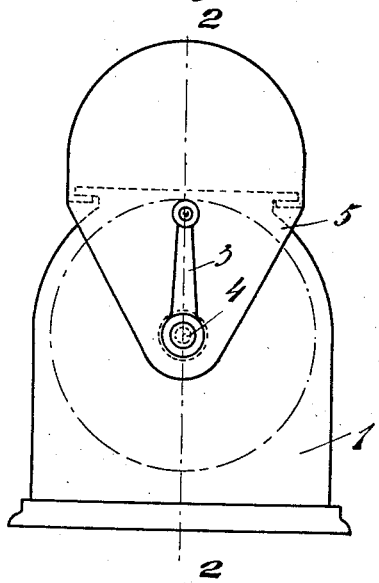
Figure 2:
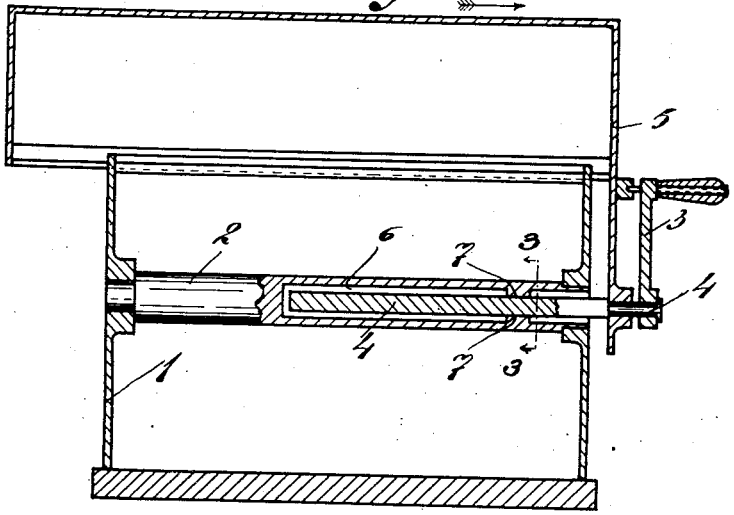
Figure 3:
Figure 4:
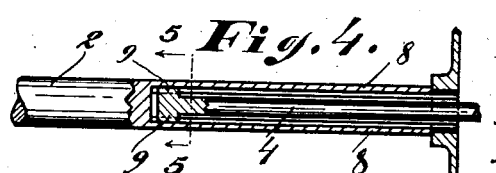
Figure 5:
Figure 8:
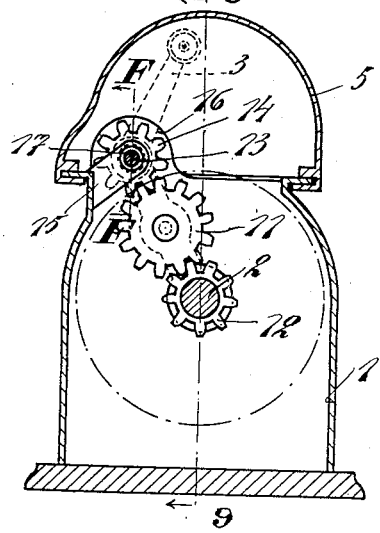
Figure 9:
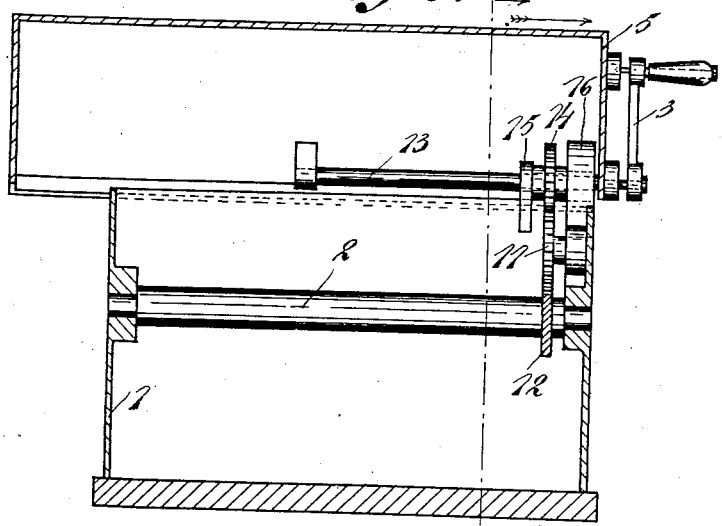
Figure 10:
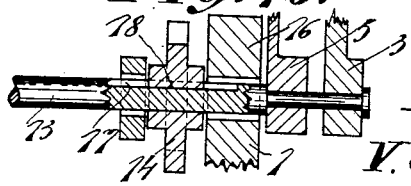

In the accompanying drawing are shown some embodiments of the present invention applied to a calculating machine—parts not necessary for the understanding of the invention being removed. Fig. 1 shows an end-view of the machine according to one of the embodiments and Fig. 2 is a section on the line 2—2 of Fig. 1. Fig. 3 is a section on the line 3—3 of Fig. 2. Figs. 4 and 5 show a modification of the embodiment according to Figs. 1–3, Fig. 5 being a section on the line 4—4 of Fig. 4. Fig. 6 is a cross-section through a calculating machine according to another embodiment of the invention and Fig. 7 is a section on the line 7—7 of Fig. 6. Figs. 8–10 show a third embodiment. Fig. 8 is a cross-section through the machine and Fig. 9 is a section on the line 9—9 of Fig. 8. Fig. 10 is a section on the line 10—10 of Fig. 8, said section being drawn on a larger scale.

A shaft 2 is journalled in the framework 1 of the machine in the ordinary way, said shaft being provided with a number of calculating wheels (not shown), turnable with the shaft. According to the embodiment shown in Figs. 1–3 the crank 3 for turning the calculating wheels is mounted on a shaft 4, which is journalled in the carriage 5 on which the indicating discs etc. are mounted and which is slidably mounted in the framework 1. The crank-shaft 4 is slidably but not rotatably mounted in a longitudinal recess 6, the length of which is greater than the maximum movement of the carriage in the shaft 2, which supports the calculating wheels. According to this embodiment the crank-shaft 4 is rectangular in cross-section and cooperates with a portion 7 in the recess 6, said portion having a form corresponding to the shaft. Thus the crank-shaft 4 can freely participate in the movement of the carriage and when being turned revolves the shaft 2 with the calculating wheels in any position of the carriage 5.

In the embodiment shown in Figs. 4 and 5 the portion of the shaft 2 which encloses the crank-shaft and which is formed with an inwardly extending longitudinal recess is provided with one or more longitudinal grooves 8, engaged by corresponding projections 9 on the crank-shaft 4. The grooves 8 can of course with the same advantage be arranged in the crank-shaft and the projections on the inside of the recess.

According to the embodiment shown in Figs. 6 and 7 the crank 3 is connected with a gear-roll 10, journalled in the carriage 5, the length of said gear-roll being greater than the miximum extension of the carriage. The roll 10 is independent of the position of the carriage by means of an intermediate wheel 11 connected with a gear-wheel 12 mounted on the calculating wheel supporting shaft 2 near to the wall of the framework. Thus when the roll is turned by means of the crank 3 the calculating wheel supporting shaft 2 is also turned.

In the embodiment shown in Figs. 8–10 the crank 3 is mounted on a shaft 13 journalled in the carriage 5, the length of said shaft being greater than the maximum extension of the carriage. A gear-wheel 14 connected with the framework is mounted on the shaft 13, said gear-wheel being by means of the gear-wheels 11, 12 connected with the calculating wheel supporting shaft 2. The gear-wheel 14 is conveniently mounted between two supports 15 and 16 respectively which extend from the framework and which are provided with holes for the crank-shaft, said portions holding the gear-wheel in a fixed position. The shaft 13 is provided with a longitudinal recess 17 which is engaged by projections 18 on the gear-wheel 14 or, inversely, a projection on the shaft 13 engages a recess in wheel 14. At the movements of the carriage the shaft 13 can be freely advanced in its longitudinal direction. When the shaft 13 is turned by means of the crank 3 the gear-wheels 14, 11, 12 and the calculating wheel supporting shaft 2 is also turned.

The shown and described embodiments of the invention which can be modified in several respects are only to be regarded as examples of carrying the invention into effect.

Having now described my invention, what I claim as new and desire to secure by Letters Patent is:

1. A calculating machine of the character described including a framework, a carriage slidably mounted on the framework and adapted to support a totalizing-counter, a shaft journalled in the framework and adapted to support the calculating wheels, a crank, means for mounting the crank on the carriage and means for operably connecting the crank mounting means with the calculating wheel supporting shaft so that the said shaft may be turned by means of the crank in any position of the carriage.

2. A calculating machine according to claim 1, wherein the operable connection between the crank and the shaft includes two parts one of which is slidable but non-rotatably mounted with respect to the other.

3. A calculating machine according to claim 1, wherein the calculating wheel supporting shaft is formed with a longitudinal recess, a rotatably mounted shaft in the carriage for supporting the crank, said crank supporting shaft being slidable but non-rotatably mounted in the recess in the calculating wheel supporting shaft so that the latter may be turned by means of the crank in any position of the carriage.

4. A calculating machine according to claim 1, wherein the calculating wheel supporting shaft is formed with a longitudinal recess, the recess being provided with a series of longitudinal grooves, a rotatably mounted shaft in the carriage for supporting the crank, a plurality of projections on the crank supporting shaft for slidably engaging the grooves in the calculating wheel supporting shaft so that the latter may be turned by means of the crank in any position of the carriage.

In witness whereof, I have hereunto signed my name.

VALENTIN JAKOB ODHNER